D. MULOCK.
Vehicle Wheel.
No. 112,167. Patented Feb. 28, 1871.
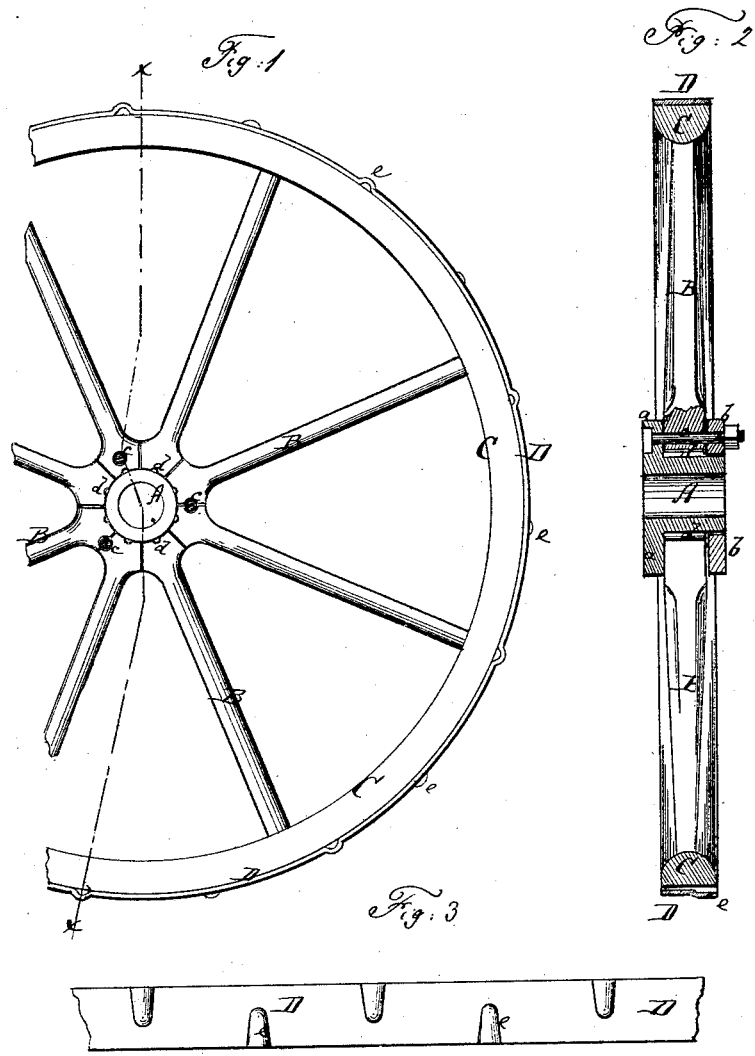

UNITED STATES PATENT OFFICE.

DANIEL MULOCK, OF MOUNT HOPE, NEW YORK.

IMPROVEMENT IN WHEELS FOR VEHICLES.

Specification forming part of Letters Patent No. 112,167, dated February 28, 1871.

*To all whom it may concern:*

Be it known that I, DANIEL MULOCK, of Mount Hope, in the county of Orange and State of New York, have invented a new and Improved Wheel for Vehicles; and I do hereby declare that the following is a full, clear, and exact description thereof, which will enable others skilled in the art to make and use the same, reference being had to the accompanying drawing, forming part of this specification, in which—

Figure 1 represents a face view, partly in section, of my improved wheel for vehicles. Fig. 2 is a central transverse section of the same, $x\ x$, Fig. 1, being the section-line. Fig. 3 is a detail face view of the indented wrought-iron tire used on the same.

Similar letters of reference indicate corresponding parts.

This invention relates to a new manner of securing spokes to the hubs of wheels, and to a novel construction of indented tire for the same.

The invention consists, first, in holding the inner ends of the spokes between two flanges of the hub, of which one is adjustable by means of screws for clamping the spokes more or less firmly, and in fitting ribs around the outer side of the hub to fit into the grooved ends of the spokes. A very simple and strong device for holding the spokes in place is thus provided, which also facilitates their removal for repair and their reinsertion.

The invention consists, also, in constructing a wrought-iron tire, with the projections required on the wheels of agricultural implements, the said projections being stamped or rolled into the metal bands. Such tires constitute desirable substitutes for the cast-iron wheels or rims heretofore required for the same purpose.

A in the drawing represents the hub of the wheel. B B are the spokes, C the fellies, and D the tire, of the same.

The hub is provided with two flanges, $a$ and $b$, between which the ends of the spokes are held, the flange $b$ being loose, so as to be laterally adjustable. It is by three or more bolts, $c\ c$, connected with the flange $a$, and is drawn tight enough against the spokes to hold them securely to the hub.

From the outer circumference of the hub project a series of longitudinal ribs, $d\ d$, one in line with each spoke, each rib entering a corresponding groove in the end of the spoke. The spokes are thereby retained in place the requisite distances apart.

The tire D is represented as adapted to agricultural machines, being provided with projecting ribs or teeth $e\ e$, for taking a firm hold on the ground.

Agricultural wheels had heretofore to be cast in order to have the said ribs or projections on their edges, and were in consequence heavy and expensive. I stamp or roll the tire in such manner that its inner face is indented in the desired manner, producing thereby the requisite projections on the outer face. The tire is applied to the wheel in the ordinary or suitable manner.

Having thus described my invention, I claim as new and desire to secure by Letters Patent—

1. The flange $a$, combined, as described, with the detachable and adjustable flange $b$, for the purpose of tightening or readily removing the spokes.

2. The wrought-iron tire D, rolled with outwardly-extending indentations $e$ thereon, as and for the purpose described.

DANIEL MULOCK.

Witnesses:
D. FERRY GRAHAM,
LEWIS A. KETCHAM.